United States Patent
DiCarlo

(10) Patent No.: US 7,411,713 B2
(45) Date of Patent: Aug. 12, 2008

(54) YOKELESS HIDDEN HINGE DIGITAL MICROMIRROR DEVICE WITH DOUBLE BINGE LAYER

(75) Inventor: Anthony DiCarlo, Richardson, TX (US)

(73) Assignee: Texas Instruments Incorporated, Dallas, TX (US)

( * ) Notice: Subject to any disclaimer, the term of this patent is extended or adjusted under 35 U.S.C. 154(b) by 186 days.

(21) Appl. No.: 11/462,707

(22) Filed: Aug. 6, 2006

(65) Prior Publication Data

US 2006/0268390 A1 Nov. 30, 2006

Related U.S. Application Data

(62) Division of application No. 10/345,586, filed on Jan. 16, 2003, now Pat. No. 7,088,486.

(60) Provisional application No. 60/353,979, filed on Jan. 31, 2002.

(51) Int. Cl.
G02B 26/08 (2006.01)

(52) U.S. Cl. .................................... 359/224; 359/291

(58) Field of Classification Search ......... 359/223–226, 359/290, 291, 871, 872
See application file for complete search history.

(56) References Cited

U.S. PATENT DOCUMENTS

| | | | |
|---|---|---|---|
| 5,583,688 A | 12/1996 | Hornbeck | |
| 5,867,202 A | 2/1999 | Knipe et al. | |
| 6,028,690 A | 2/2000 | Carter et al. | |
| 6,282,010 B1 * | 8/2001 | Sulzbach et al. | 359/249 |
| 6,781,731 B2 | 8/2004 | Choi | |
| 7,011,415 B2 | 3/2006 | DiCarlo et al. | |
| 2006/0152690 A1 | 7/2006 | DiCarlo et al. | |

* cited by examiner

Primary Examiner—Euncha P Cherry
(74) Attorney, Agent, or Firm—Wade James Brady, III; Frederick J. Telecky, Jr.

(57) ABSTRACT

A micromirror array 110 fabricated on a semiconductor substrate 11. The array 110 is comprised of four operating layers 12, 13, 14, 15. An addressing layer 12 is fabricated on the substrate. A raised electrode layer 13 is spaced above the addressing layer by an air gap. A hinge layer 14 is spaced above the raised electrode layer 13 by another air gap. A mirror layer 15 is spaced over the hinge layer 14 by a third air gap.

4 Claims, 5 Drawing Sheets

YOKELESS HIDDEN HINGE DIGITAL MICROMIRROR DEVICE WITH DOUBLE BINGE LAYER

RELATED APPLICATION

This application is a divisional of application Ser. No. 10/345,586, filed Jan. 16, 2003 now U.S. Pat. No. 7,088,486 which claims the benefit of provisional Application No. 60/353,979, filed Jan. 31, 2002.

This application is related to co-pending application Ser. No. 10/298,423 filed Nov. 21, 2001 entitled "Yokeless Hidden Hinge Digital Micromirror Device" now U.S. Pat. No. 7,011,415.

TECHNICAL FIELD OF THE INVENTION

This invention relates to micro-electromechanical devices and their fabrication, and more particularly to a digital micromirror device having an improved design.

BACKGROUND OF THE INVENTION

A Digital Micromirror Device™ (DMD™) is a type of microelectromechanical systems (MEMS) device. Invented in 1987 at Texas Instruments Incorporated, the DMD is a fast, reflective digital light switch. It can be combined with image processing, memory, a light source, and optics to form a digital light processing system capable of projecting large, bright, high-contrast color images.

The DMD is fabricated using CMOS-like processes over a CMOS memory. It has an array of individually addressable mirror elements, each having an aluminum mirror that can reflect light in one of two directions depending on the state of an underlying memory cell. With the memory cell in a first state, the mirror rotates to +10 degrees. With the memory cell in a second state, the mirror rotates to −10 degrees. By combining the DMD with a suitable light source and projection optics, the mirror reflects incident light either into or out of the pupil of the projection lens. Thus, the first state of the mirror appears bright and the second state of the mirror appears dark. Gray scale is achieved by binary pulsewidth modulation of the incident light. Color is achieved by using color filters, either stationary or rotating, in combination with one, two, or three DMD chips.

DMD's may have a variety of designs, and the most popular design in current use is a structure consisting of a mirror that is rigidly connected to an underlying yoke. The yoke in turn is connected by two thin, mechanically compliant torsion hinges to support posts that are attached to the underlying substrate. Electrostatic fields developed between the underlying memory cell and the yoke and mirror cause rotation in the positive or negative rotation direction.

The fabrication of the above-described DMD superstructure begins with a completed CMOS memory circuit. Through the use of six photomask layers, the superstructure is formed with alternating layers of aluminum for the address electrode, hinge, yoke, and mirror layers and hardened photoresist for sacrificial layers that form air gaps.

SUMMARY OF THE INVENTION

One aspect of the invention is an array of digital micromirror pixel elements. The array has a structure defined by three layers spaced from each other with an air gap between each layer. A mirror layer has a reflective mirror associated with each pixel element. A hinge layer is spaced under the mirror layer, and has a torsion hinge under each mirror and attached to the mirror such that the mirror may tilt above the hinge layer. The hinge layer further has spring tips under each mirror and mechanically connected to the address layer. An outboard electrode layer has raised outboard electrodes for providing electrostatic attraction to the underside of each mirror. An address layer is spaced under all these layers, and has circuitry for controlling operation of the pixel elements.

As stated in the Background, conventional DMD designs have a yoke under the mirror, at the hinge level. During operation, the yoke rather than the mirror lands on an underlying landing surface. The yoke has spring tips, used for landing. In the present invention, there is no yoke and the mirror lands on spring tips that are stationary under the mirror at the hinge level. At the same time, the outboard electrode layer provides a sufficiently large air gap under the mirror so as to permit proper operation of the DMD.

DETAILED DESCRIPTION OF THE INVENTION

U.S. Pat. Ser. No. 10/298423, referenced above, describes a yokeless hidden hinge DMD design, having three layers. The middle layer comprises a hinge, spring tips, and raised electrodes. This layer is sometimes referred to as a "binge" layer because it replaces the yoke and beam layers of previous designs. The present invention is directed to a four layer, "double binge", design, in which a new layer, lower than the hinge and spring tips, has an additional raised "outboard" electrode.

Figure 1:
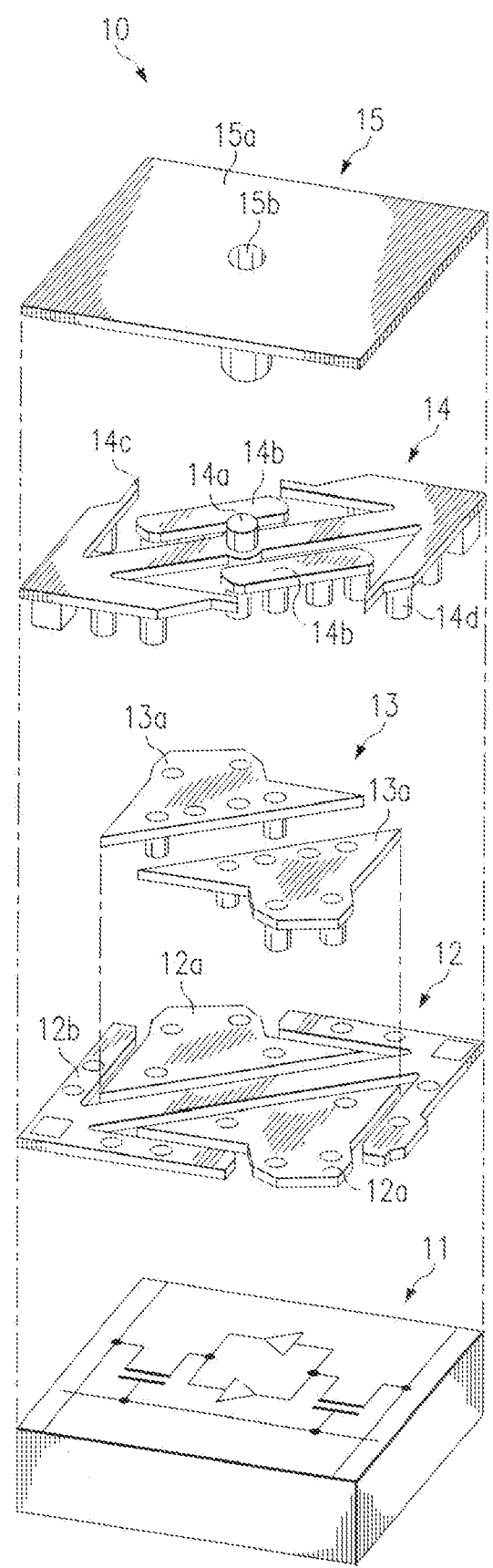
FIG. 1 is an exploded view of a DMD pixel element in accordance with the invention.

FIG. 1 is an exploded view of a DMD pixel element 10 in accordance with the invention. Pixel element 10 is one of an array of such elements fabricated on a wafer, using semiconductor fabrication techniques.

DMD pixel element 10 is a monolithically integrated MEMS superstructure cell fabricated over a CMOS SRAM cell 11. Three sacrificial layers (see FIGS. 2, 8, and 10) have been removed by plasma etching to produce air gaps between four metal layers of the superstructure. For purposes of this description, the four metal layers are "spaced" apart by being separated by these air gaps.

The uppermost metal layer 15 has a reflective mirror 15*a*. The air gap under the mirror 15*a* frees the mirror 15*a* to rotate about a compliant torsion hinge 14*a*, which is part of the second metal layer 14. A third metal layer 13 comprises two raised outboard electrodes 13*a*. A fourth metal (M3) layer 12 has address electrodes 12*a* for the mirror 15*a*, the address electrodes 12*a* being connected to SRAM cell 11. The M3 layer 12 further has a bias bus 12*b*, which interconnects the mirrors 15*a* of all pixels to a bond pad at the chip perimeter. An off-chip driver supplies the waveforms necessary for proper digital operation.

The DMD mirrors 15*a* are each 16 um square and made of aluminum for maximum reflectivity. They are arrayed on 17 um centers to form a matrix having a high fill factor (~90%). The high fill factor produces high efficiency for light use at the pixel level and a seamless (pixelation-free) projected image. The placement of hinge layer 14 under the mirrors 15*a* permits a close spacing of the mirrors 15 to each other. Because of the underlying placement of the hinges, an array of pixel elements 10 is referred to as a "hidden hinge" type DMD architecture.

In operation, electrostatic fields are developed between the mirror 15*a* and its address electrodes, which include the electrodes 12*a* on layer 12 as well as the raised electrodes 13*a* on layer 13. As explained below and as illustrated in FIG. 1, layer 14 may have additional "inboard" electrodes 14*b*. The electrostatic fields create and electrostatic torque, which works against the restoring torque of the hinge 14*a* to produce mirror rotation in a positive or negative direction. The mirror 15*a* rotates until it comes to rest (or lands) against spring tips 14*c*, which are part of the hinge layer 14. These spring tips 14*c* are attached to the underlying structure by means of spring tip support posts 14*d*, and thus provide a stationary but flexible landing surface for the mirror 15*a*.

A feature of the invention is the increase in the distance between hinge layer 14 and the address layer 12, which is provided by the addition of layer 13. This distance enhances proper operation of hinge 14*a*. It also permits the spacing of the distance between the underside of mirror 15*a* and the raised electrodes 13*a* to be optimized. Specifically, layer 13 permits the spacing of these various elements to be such that electrostatic torque is optimized but without air damping that would be caused by too small a gap under hinge 14*a*. It also results in quick settling times for mirrors 15*a* upon touch-down.

As shown in FIG. 1, raised electrodes 13*a* generally correspond to the address electrodes 12*a* of layer 12. They are extend outward so that they are under the opposing tips of mirror 15*a*, and for this reason are referred to herein as "outboard" electrodes. However, in addition to the pattern shown in FIG. 1, various other patterns for layer 13. In other embodiments, layer 13 might contain additional structure for support of hinge layer 14 other than the support vias shown in FIG. 1. In general, however, the common characteristics of a suitable raised outboard electrode layer 13 are raised electrodes 13*a* connected to metal layer 12, and some means of support (whether support posts or additional structure) for hinge layer 14.

FIGS. 2-11 illustrate the DMD fabrication process.

Figure 2:
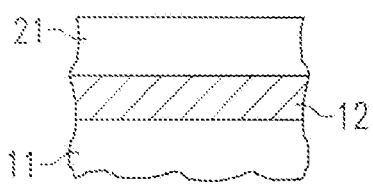
FIG. 2 is a cross sectional view of the layers of a DMD wafer through deposition and etching of a first spacer layer.

FIG. 2 is a cross sectional view of the layers of a DMD wafer through the deposition of the first spacer (S1) layer 21. Fabrication of a DMD in accordance with the invention follows conventional DMD fabrication up through deposition of a first spacer layer, S1. Thus, the fabrication of the DMD superstructure begins with a completed CMOS memory circuit 11. Circuit 11 may be a conventional 5T or 6T SRAM cell. A thick oxide is deposited over the CMOS surface and then planarized, such as by using a chemical mechanical polish (CMP) technique. The CMP step provides a completely flat substrate for DMD superstructure fabrication.

Through the use of photomasking techniques, the M3 layer 12 is formed above the CMOS 11. This M3 layer 12 is formed with aluminum for address and bus circuitry. The aluminum is sputter-deposited and plasma-etched using plasma-deposited $SiO_2$ as the etch mask. M3 layer 12 may be etched in a pattern used for DMD structures previously described in U.S. Pat. No. 6,028,690, entitled "Reduced Micromirror Gaps for Improved Contrast Ratio, and in U.S. Pat. No. 5,583,688, entitled "Multi-level Digital Micromirror Device", both assigned to Texas Instruments Incorporated. These patents are incorporated by reference herein.

A spacer layer 21, identified as S1, is then deposited over the M3 layer 11. Spacer layer 21 may be formed from hardened photoresist. Later in the packaging flow, this spacer layer 21 is plasma-ashed to form an air gap, but leaving the support posts shown in FIG. 1. As explained below, these support posts are made from vias that are filled with deposited material that is left after the spacer layers are removed.

Figure 3:
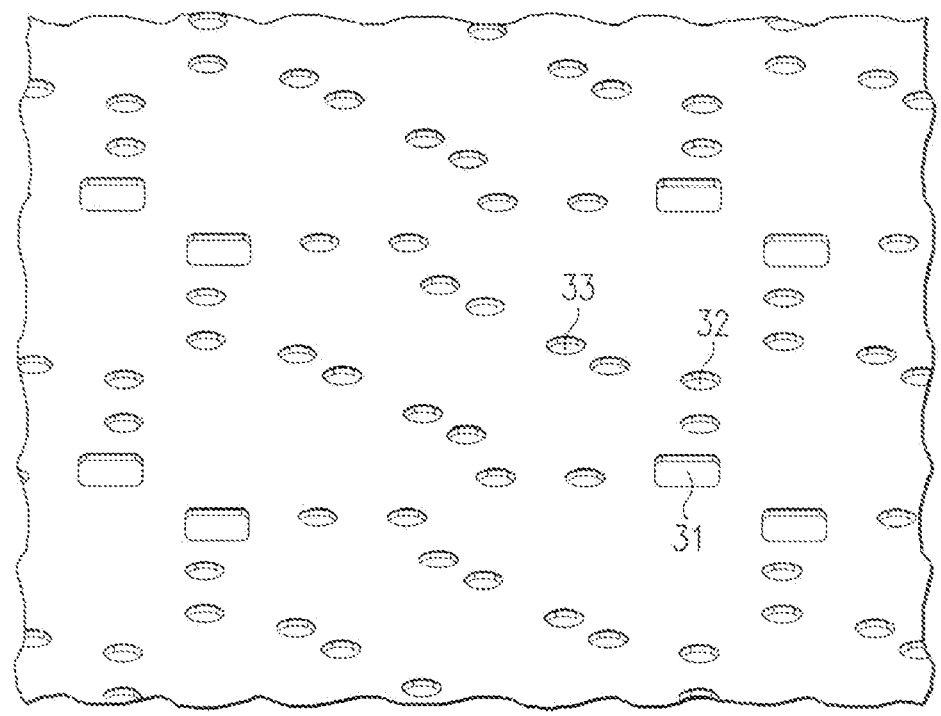
FIG. 3 is a perspective view of the surface of the first spacer layer.

FIG. 3 is a perspective view of the surface of the first spacer layer 21 after the vias have been formed. It illustrates spring tip support vias 31, hinge support vias 32, and electrode support vias 33. These vias may be formed by conventional pattern and etching techniques.

Figure 4:
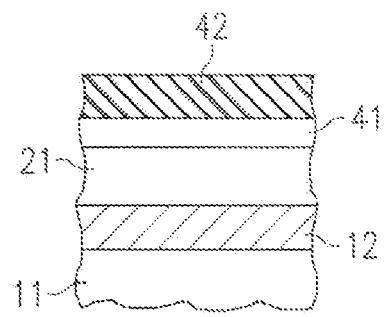
FIG. 4 is a cross sectional view of the layers of a DMD wafer through deposition of a raised electrode layer and an oxide layer.

Referring to FIG. 4, the raised electrode layer 14 is formed by deposition of a metal layer 41 and an oxide layer 42 over the patterned spacer layer 21. The metal is typically an aluminum alloy, such as AlTiO. An example of a suitable thickness for metal layer 41 is 840 angstroms. An example of a suitable thickness for oxide layer 42 is 5000 angstroms.

Figure 5:
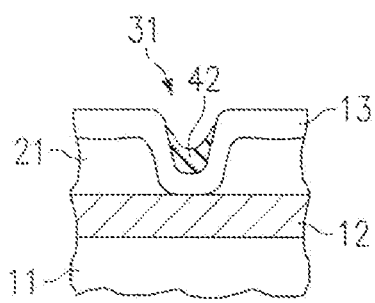
FIG. 5 is a cross sectional view of the layers of a DMD wafer through deposition and etching of the oxide layer of FIG. 4.

FIG. 5 illustrates a portion of the partially fabricated DMD having a via 31, 32, or 33, after a patterned etch process that etches oxide layer 42. The etch leaves an oxide coating within the vias 31, 32, or 33. The oxide at the bottom of the vias covers the thin metal at the bottom of each via, thereby providing strengthening. A develop rinse is then performed, or other cleanup to remove residue and prevent surface contamination. As an alternative to a patterned etch, a blanket etch could be used, which would tend to leave the oxide on the via side walls. As an alternative to oxide layer 42, a metal material rather than oxide could be deposited.

Figure 6:
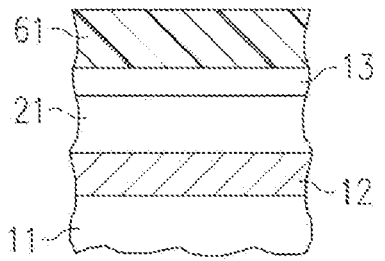
FIG. 6 is a cross sectional view of the layers of a DMD wafer through deposition of a patterning layer for patterning the raised electrodes.

FIG. 6 illustrates the deposition and patterning of a patterning layer 61, which is patterned and etched to form the raised electrodes 13*a*. The patterning layer 61 is etched with an electrode etch mask in the pattern illustrated for layer 13 in FIG. 1. In the embodiment of FIG. 1, each element 10 has two raised electrodes, one each under opposing tips of mirror 15*a*. Then patterning layer 61 is chemically removed. The patterned raised electrode layer 13 is then descumed.

In operation, the raised electrodes 13*a* are in electrical communication with the address electrodes 12*a* on layer 12, such as by means of vias. However, in other embodiments, layer 13 may be patterned such that raised electrodes on layer 13 carry voltages from different sources, such as bias or reset voltages from bias/reset bus 12*b*.

Figure 7:
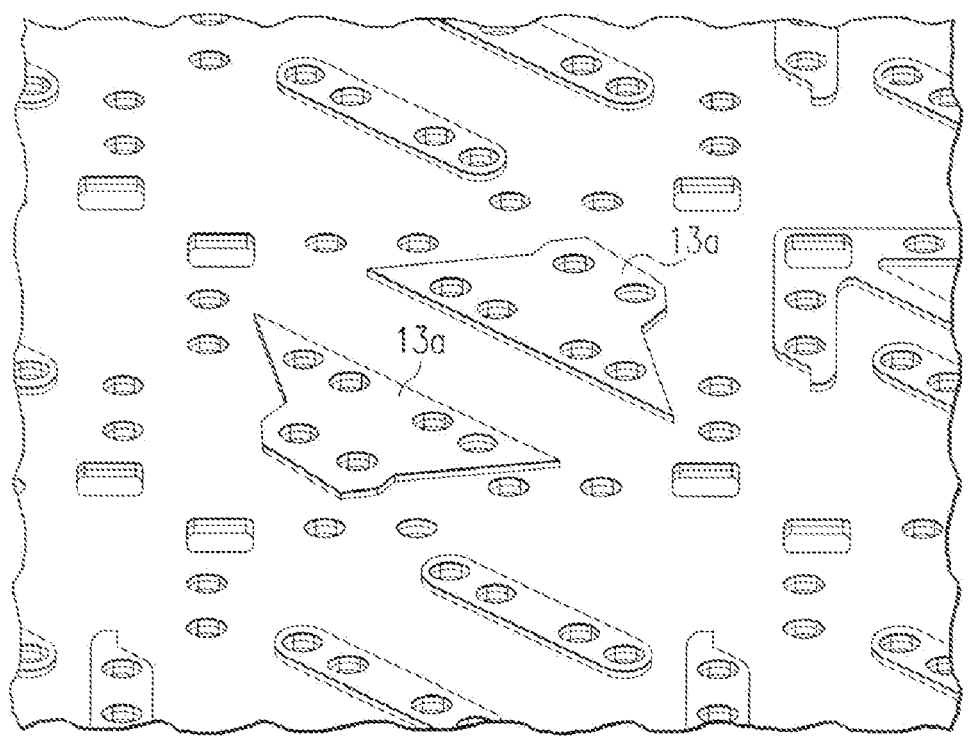
FIG. 7 is a perspective view of the surface of the raised electrode layer after patterning.

FIG. 7 is a perspective view of the surface of the raised electrode layer 13. Referring also to FIGS. 1 and 3, the vias 31, 32, 33, now filled with deposited material, form support posts after the spacer layer 21 is removed. As explained below, the spring tip vias 31 and hinge vias 32 will be extended through a subsequent spacer layer.

Figure 8:
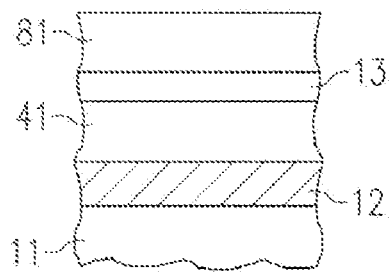
FIG. 8 is a cross sectional view of the layers of a DMD wafer through deposition of a second spacer layer.

FIG. 8 illustrates the deposition of a second spacer layer 81. The spring tip support vias 31 and hinge support vias 32 are etched through this spacer layer in a pattern corresponding to the existing vias of FIGS. 3 and 7. If desired, the via pattern on layer 81 may be "overexposed" relative to the vias in layer 21. The result of the overexposure is that the top portion of the vias (formed in layer 81) is slightly larger in diameter relative to the bottom portion (formed in layer 21).

Figure 9:
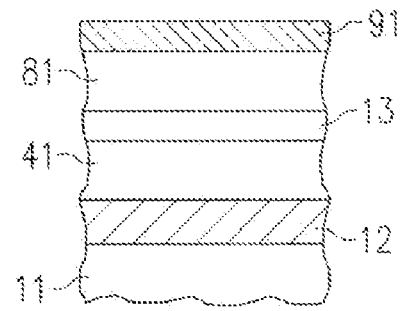
FIG. 9 is a cross sectional view of the layers of a DMD wafer through deposition of a hinge metal layer.

FIG. 9 illustrates the deposition of a hinge metal layer 91. This layer may be similar in material and thickness to the raised electrode layer 61 of FIG. 6. This layer 91 is patterned and etched to form layer 14 of FIG. 1, which comprises the hinge 14a and spring tips 14c. Two spring tips 14c are located under each of the two tilting corners of mirror 15a. In the embodiment of FIG. 9, the hinge 14a and spring tips 14b form a continuous pattern with the two spring tip beams 14b extending at an angle from each end of hinge 14a, but other patterns are possible. For example, one or two landing tips may be used, at a 45 degree or 90 degree angle orientation to the hinge. Referring again to FIG. 1, hinge layer 14 may also have "inboard" electrodes 14b, referred to as such because they are positioned under mirrors 15a inward from the mirror tips.

Figure 10:
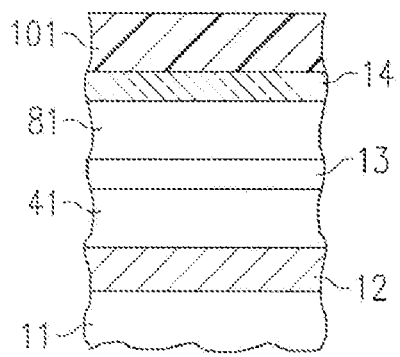
FIG. 10 is a cross sectional view of the layers of a DMD wafer through deposition of a third spacer layer.

FIG. 10 illustrates the deposition of a third spacer layer 101. The mirror vias 15a, illustrated in FIG. 1, are patterned and etched into this layer.

Figure 11:
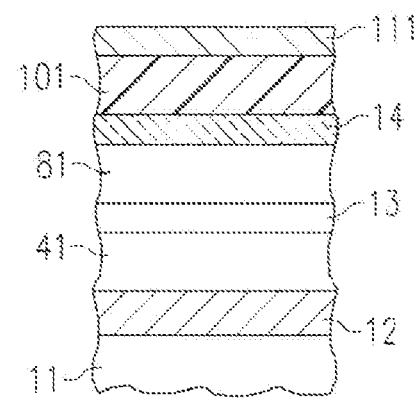
FIG. 11 is a cross sectional view of the layers of a DMD wafer through deposition of a mirror metal layer.

FIG. 11 illustrates deposition of metal mirror layer 111, from which mirror 15a is patterned and etched.

The packaging flow begins with the wafers partially sawed along the chip scribe lines to a depth that will allow the chips to be easily broken apart later. Before separating the chips from one another, each chip is tested for full electrical and optical functionality by a high-speed automated wafer tester. The chips are then separated from the wafer, and proceed to a plasma etcher that is used to selectively strip the organic sacrificial layers, S1 and S2, from under the mirror layer 15 and hinge layer 14. The chips are then plasma-cleaned, relubricated, and hermetically sealed in a package.

Figure 12:
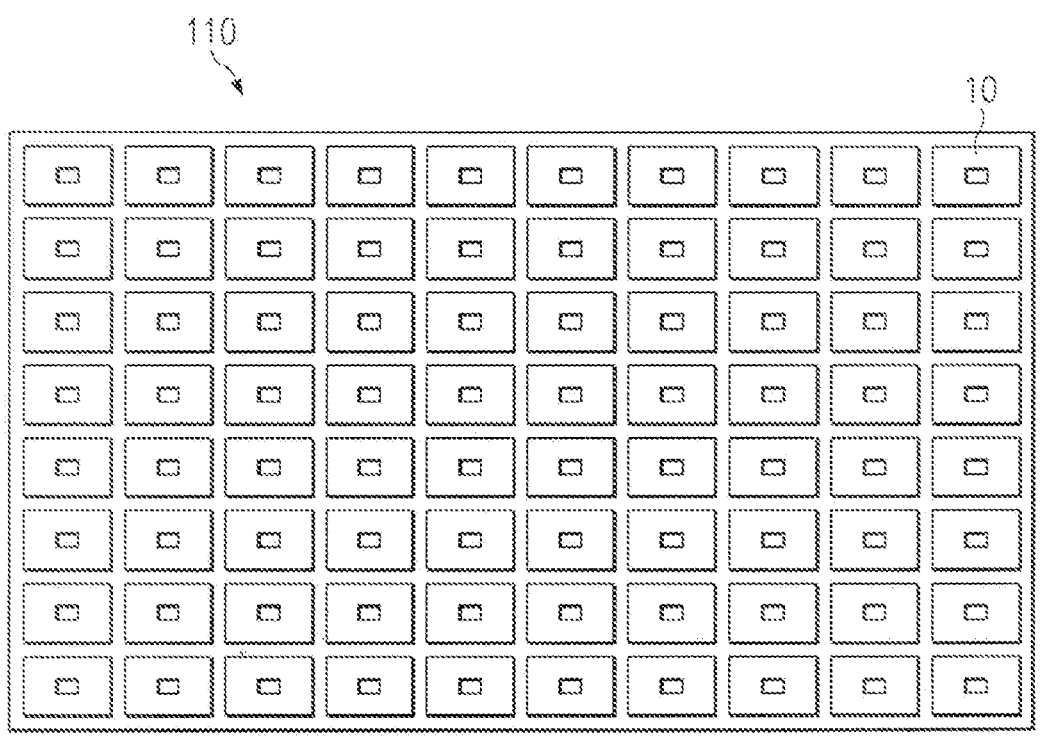
FIG. 12 is a top plan view of the mirror elements of a DMD array.

FIG. 12 is a top view of an array 110 of mirror elements 10. DMD arrays often have more than a thousand rows and columns of pixel elements 10. Packaged DMD chips are commercially available in various array sizes. For example, SVGA (800×600) and SXGA (1280×1024) arrays have been made. The diagonals of the active area are 0.7 inches and 1.1 inches, respectively.

Figure 13:
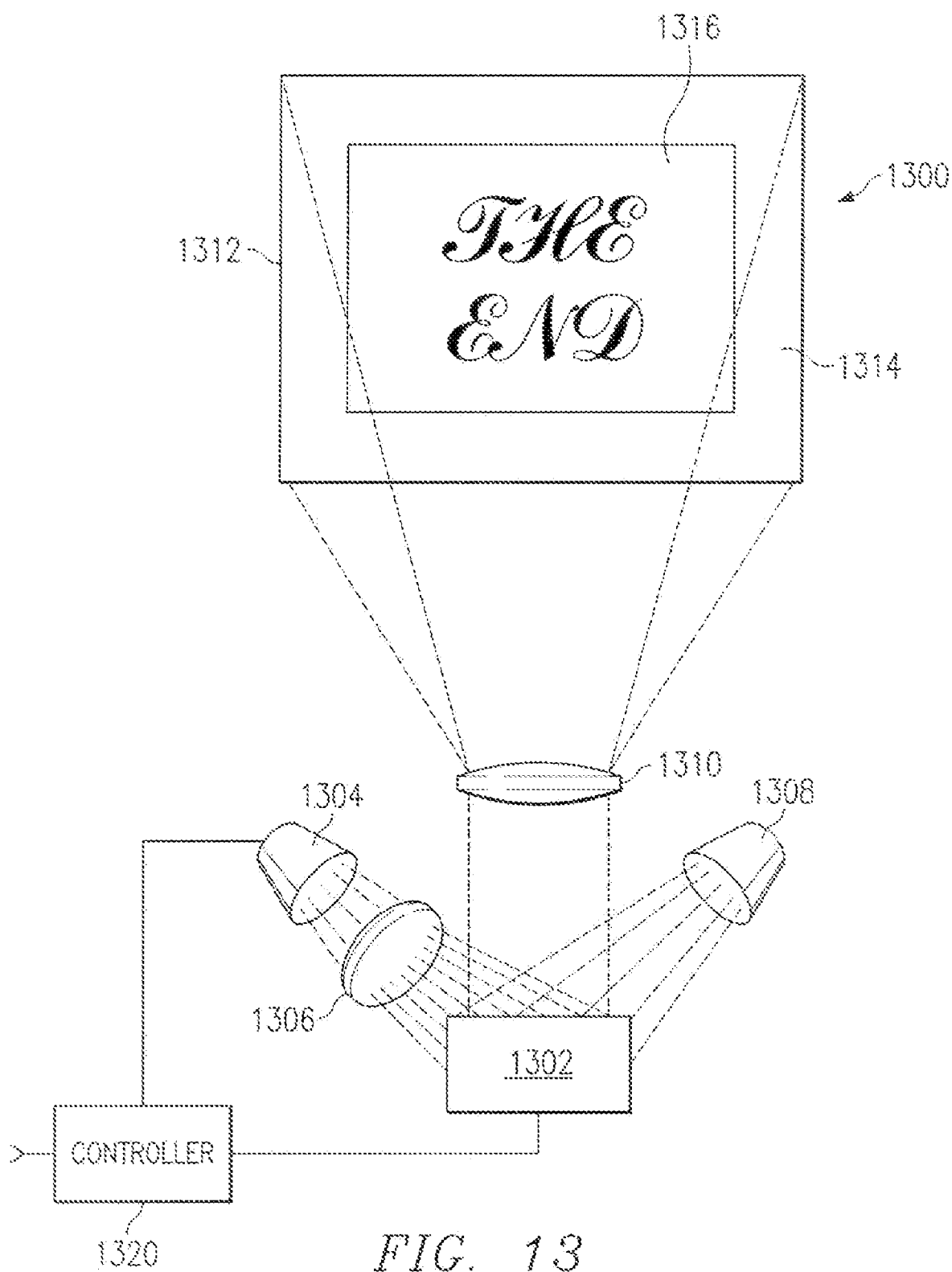
FIG. 13 is a schematic representation of a projection display system having a DMD array in accordance with the invention.

FIG. 13 is a schematic view of an image projection system 1300 having an improved micromirror device 1302 in accordance with the invention. Light from light source 1304 is focused on the micromirror device 1302 by lens 1306. Although shown as a single lens, lens 1306 is typically a group of lenses and mirrors which together focus and direct light from the light source 1304 onto the surface of the micromirror device 1302. Mirrors on the micromirror device that are rotated to an off position reflect light to a light trap 1308 while mirrors rotated to an on position reflect light to projection lens 1310, which is shown as a single lens for simplicity. Projection lens 1310 focuses the light modulated by the micromirror device 1302 onto an image plane or screen 1312. Mirrors in the exterior border region of micromirror device 1302 direct the light impinging on the border region to the light trap 1308, ensuring that the border region of the display 13 is very dark and creating a sharp contrast with the interior image portion 1316 of the image plane. Controller 1320 provides timing and control signals for operating the pixel elements in the manner described above and in the referenced patents.

OTHER EMBODIMENTS

Although the present invention has been described in detail, it should be understood that various changes, substitutions, and alterations can be made hereto without departing from the spirit and scope of the invention as defined by the appended claims.

What is claimed is:

1. A method of forming an array of micromirror elements, comprising the steps of:
    depositing a first spacer layer on a substrate;
    patterning the first spacer layer to define lower hinge support vias and raised electrode vias;
    depositing a raised electrode layer over the first spacer layer;
    patterning the raised electrode layer to form at least two raised electrodes associated with each micromirror elements;
    depositing a second spacer layer over the patterned raised electrodes;
    patterning the second spacer layer to form hinge support vias over the lower hinge support vias;
    depositing a hinge layer over the second spacer layer;
    patterning the hinge layer to form at least one hinge associated with each micromirror element;
    depositing a third spacer layer over the hinge layer;
    patterning the third spacer layer to define mirror support vias;
    depositing a mirror layer over the third spacer layer;
    patterning the mirror layer to form an array of micromirrors; and
    removing the first, second, and third spacer layers.

2. The method of claim 1, wherein the hinge layer is further patterned to form at least two spring tips under each mirror.

3. The method of claim 1, wherein the patterning is accomplished by photolithographic processes.

4. The method of claim 1, wherein each mirror is rectangular in shape, wherein the hinge is under the diagonal axis of the mirror such that the mirror tilts around the diagonal axis.

* * * * *